Dec. 16, 1969          C. C. ROBINSON          3,484,152
FARADAY ROTATORS UTILIZING ALUMINA-SILICATE GLASSES CONTAINING
RARE EARTH METAL OXIDES
Filed Oct. 4, 1965                     3 Sheets-Sheet 1
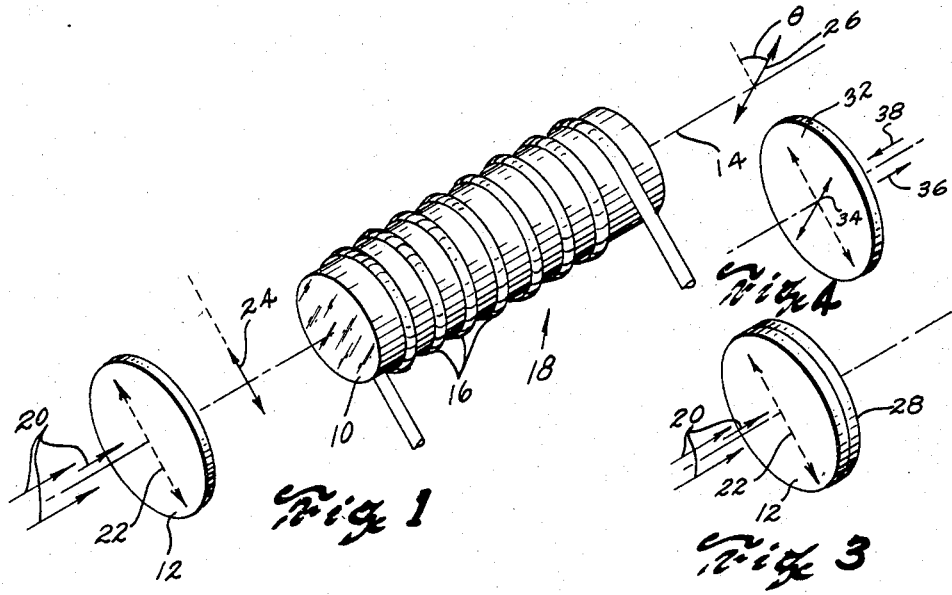
Fig. 1
Fig. 3
Fig. 4
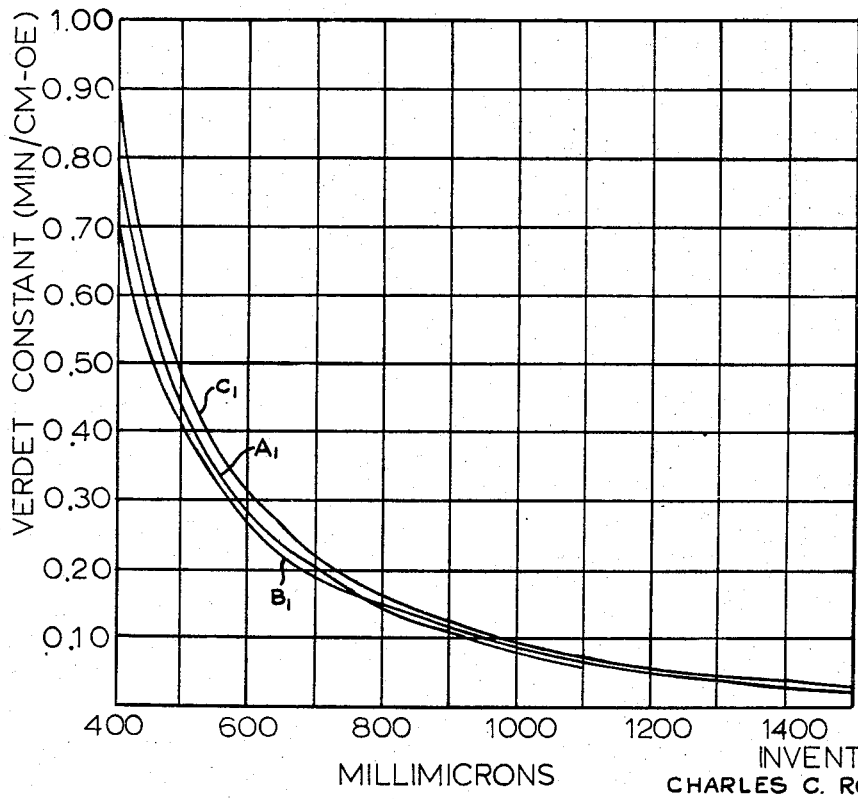
Fig. 2
INVENTOR
CHARLES C. ROBINSON Dec. 16, 1969
C. C. ROBINSON
3,484,152
FARADAY ROTATORS UTILIZING ALUMINA-SILICATE GLASSES CONTAINING
RARE EARTH METAL OXIDES
Filed Oct. 4, 1965
3 Sheets-Sheet 2
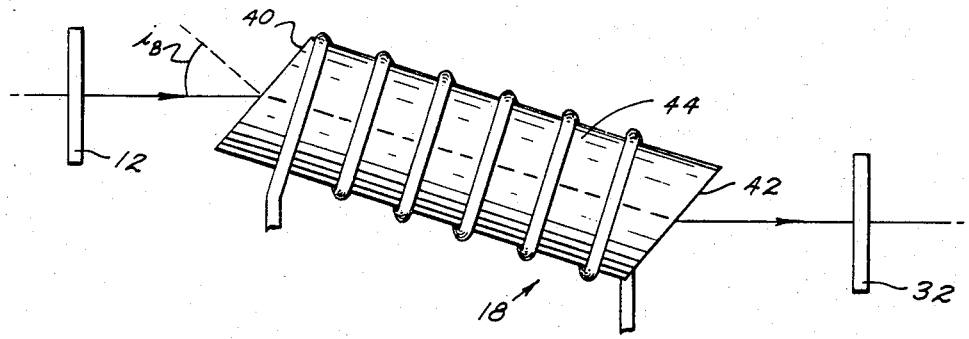
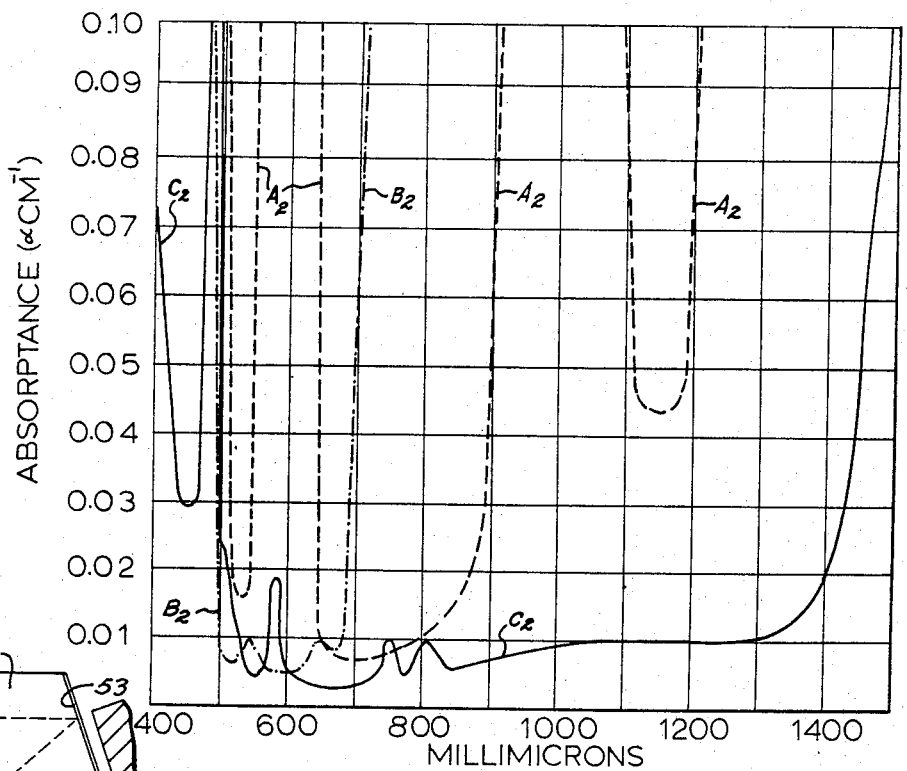
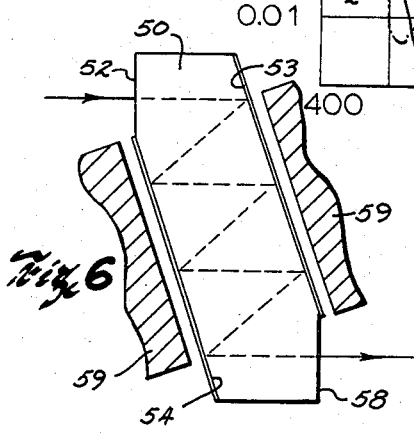
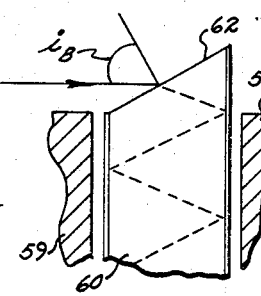
INVENTOR
CHARLES C. ROBINSON
BY
Noble J. Williams
ATTORNEY

INVENTOR
CHARLES C. ROBINSON

United States Patent Office 3,484,152
Patented Dec. 16, 1969

3,484,152
FARADAY ROTATORS UTILIZING ALUMINA-SILICATE GLASSES CONTAINING RARE EARTH METAL OXIDES
Charles C. Robinson, Sturbridge, Mass., assignor, by mesne assignments, to American Optical Corporation, a corporation of Delaware
Continuation-in-part of application Ser. No. 372,198, June 3, 1964. This application Oct. 4, 1965, Ser. No. 496,243
Int. Cl. G02f 1/22, 1/26, 1/28
U.S. Cl. 350—151                                18 Claims

ABSTRACT OF THE DISCLOSURE

An improved Faraday rotation device having large Verdet constants for polarized light and at the same time transmitting unpolarized light of a selected wavelength is provided. The improvement results from forming the Faraday rotation member of said device of an alumina-silicate type glass containing large amounts of a selected trivalent rare earth metal oxide.

CROSS-REFERENCE TO RELATED APPLICATION

This is a continuation-in-part of application Ser. No. 372,198 filed June 3, 1964, now abandoned.

This invention relates to improvements in Faraday rotation means and the like having large Verdet constants for polarized light and at the same time having good transmission characteristics for unpolarized light of a selected wavelength or wavelengths within a predetermined wavelength region of the optical spectrum so as to be useful in optical systems for allowing or preventing the passage of polarized light therethrough or for variously controlling the rotation of the plane of polarization of polarized light passing therethrough.

More particularly the invention relates to improvements in such Faraday rotation means formed of an alumina-silicate type of glass having large amounts of a selected trivalent rare earth metal oxide therein so as to provide not only said large Verdet constant but also good light transmission characteristics at the preselected wavelength or wavelengths and additionally other desirable optical and physical properties such as high refractive index with low dispersion, good workability during fabrication, good stability at room temperature or other working temperatures above or below room temperature, and good resistance to chemical attack and the like.

In fact, it has now been found that by using large amounts of a rare earth metal oxide of high purity selected from a group of trivalent rare earth metal oxides in an alumina-silicate type glass composition and with the other ingredients of the glass composition also of high purity, it is possible to obtain a glass having a very large Verdet constant together with better light transmission characteristics than have been possible heretofore.

It should be noted that when a beam of plane polarized light passes through a plate of ordinary glass which is being subjected to a magnetic field and with this light travelling in the direction of the lines of force of this magnetic field, the plane of polarization of this light will be rotated somewhat due to what is commonly called its Faraday magneto-optic effect. While certain known glasses, such as heavy lead silicate glasses, have been used heretofore as Faraday rotators, they have not functioned as well as might be desired, for they have failed to provide as high Verdet constants ($V=.071$ at 700 m$\mu$) as might be desired. Also, these earlier glasses have failed to provide as low light absorptions for transmitted light as desired within certain preselected wavelength regions. Additionally, since they were not paramagnetic, they did not increase their respective Verdet constants with decreases in temperature. Another known glass, a metaphosphate glass containing rare earth metal oxides has likewise been used as a Faraday rotator but has exhibited only a fair value for its Verdet constant. Also, Faraday rotation has been obtained by other materials which have exhibited large Verdet constant values, but these latter materials have been poor in light transmission and, accordingly, could not be used in thickness sufficient to give rotations of desired magnitudes.

It has now been discovered that improved Faraday rotators, and the like, made of glass and having large Verdet constants as well as high light transmission efficiencies at a selected wavelength or wavelengths within a predetermined wavelength region, can be provided by the use of alumina-silicate glasses having large amounts of a trivalent rare earth metal oxide of high purity therein selected from a predetermined group consisting of praseodymium oxide, dysprosium oxide and terbium oxide. While a single one of these three rare earth oxides is preferred in most cases, it would be possible to obtain good results while using a chemically equivalent mixture of two or even of all three of these three specified rare earth oxides when careful consideration as to the specific absorption characteristics (as will be later described) is exercised.

As between glasses using these different selected rare earth metal oxides for providing high Verdet constant values and good light transmission etc., terbium oxide alumina-silicate glasses are most frequently preferred since when terbium oxide is contained in sufficient amounts in alumina-silicate glass, it is by far the best in providing high degrees of transparency in most parts of the ultra-violet, visible and infra-red regions of the spectrum (between 400 and 1500 millimicrons) and this, of course, includes the regions of the spectrum surrounding 690 m$\mu$ and 1060 m$\mu$; the wavelengths at which ruby crystal lasers and neodymium glass lasers emit. On the other hand, when sizable amounts of a Faraday rotator type of glass are required and are to provide good light transmission in certain preselected regions of the spectrum such as in the 650 to 900 region or in the 510 to 550 region, praseodymium oxide, for example, might be preferred in the glass batch since a glass of this type can be obtained at a much lesser cost therefrom than from use of either of the other mentioned trivalent rare earth metal oxides.

It is, accordingly, a principal object of the present invention to provide improved means in the form of a Faraday rotation device or structure including a rotation element having a very large Verdet constant and high light transmittance at a preselected wavelength or wavelengths within a predetermined wavelength region of the optical spectrum; said rotation element being formed of an alumina-silicate type of glass containing a large percentage of a single selected trivalent rare earth metal of praseodymium oxide, dysprosium oxide and terbium oxide therein.

It is also an object of the invention to provide for use in a Faraday rotation device or structure an improved rotation element having a very large Verdet constant and high light transmittance at a preselected wavelength or wavelengths within a predetermined wavelength region; said rotation element being formed of an alumina-silicate glass containing a large percentage of a single selected rare earth metal oxide of very high purity and selected from a group consisting of trivalent praseodymium oxide, $Pr^{3+}$, trivalent dysprosium oxide, $Dy^{3+}$, and trivalent terbium oxide, $Tb^{3+}$, or various chemically equivalent mixtures of any two or more of said trivalent oxides.

It is an additional object of the present invention to provide an improved Faraday rotation device or structure having a rotation element formed of an alumina-silicate type glass containing a high percentage of a single selected trivalent rare earth metal oxide of very high purity and selected from the group set forth above and of an amount of said rare earth oxide ranging between approximately 30% and 70% by weight of the glass composition, or an equivalent amount consisting of a mixture of any two or more of said trivalent rare earth metal oxides.

Other objects and advantages of the invention will become apparent from the detailed description which follows when taken in conjunction with the accompanying drawing in which:

FIG. 1 is a diagrammatic perspective view showing optical means including a Faraday rotation device or structure including a rotation element formed of a glass embodying the present invention;

FIG. 2 is a chart for showing Verdet constant values of improved glasses embodying the present invention plotted at near "room temperature" and for various wavelengths in parts of the ultra-violet, in the visible and in parts of the infra-red regions of the spectrum;

FIGS. 3 and 4 are perspective views of different polarizing means for use with the structure of FIG. 1;

FIG. 5 is a side elevatioinal view of a modified form of Faraday rotator structure;

FIG. 6 is a side elevational view of still another modified form of Faraday rotator structure;

FIG. 7 is a fragmentary side elevational view of another modified form of Faraday rotator;

FIG. 8 is a chart for showing absorptance values for the improved Faraday rotator glasses;

Figure 9:
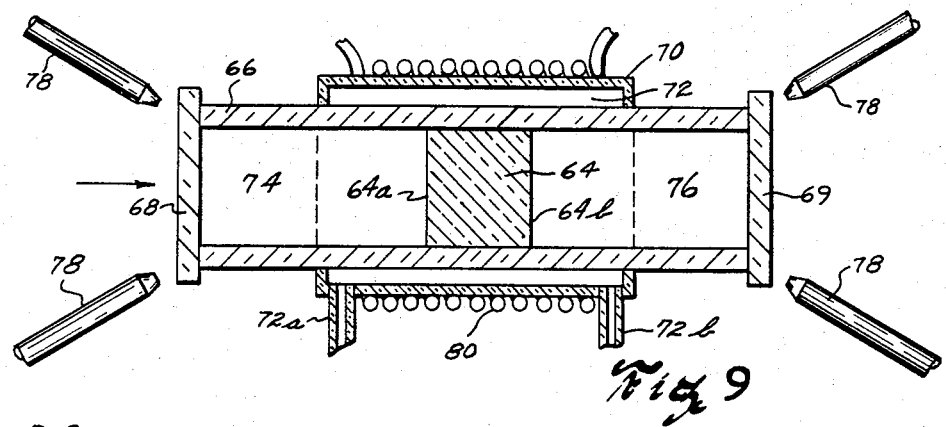
FIG. 9 is a longitudinal sectional view of another form of device or structure embodying the present invention.

Referring to FIG. 1 of the drawing, it will be seen that means in the form of a Faraday rotation device or structure includes an elongated preferably cylindrically-shaped member or element of appreciable length and having optically finished plane parallel entrance and exit faces is indicated at 10 in spaced optically aligned relation to a light-polarizing member 12 along a common optical axis 14. Around this elongated element 10 are arranged the coils 16 of a solenoid, or the like, 18 which may be connected in conventional fashion to a suitable source of electric current for creating and controlling the strength of and even the direction of an electro-magnetic field which has its central lines of force (not shown) extending through the elongated element in directions generally parallel to the optical axis 14.

A light source (not shown) would be arranged to direct incident light, as suggested by the arrows 20, onto light-polarizing member 12, whose plane of polarization is indicated by the double-headed arrow 22. It follows that that part of the light which passes through polarizer 12 will be linearly polarized light vibrating in the direction indicated by the double-headed arrow 24 and the plane of vibration of this light after passing through the elongated rotation element 10, while same is excited by the magnetic field of solenoid 18, is indicated by the titled doubleheaded arrow 26; the plane of vibration of this light having been rotated about the optical axis 14 by the magnetic through a controlled angular amount $\theta$.

The rotation element 10 is formed of an alumina-silicate type of glass to which has been added large amounts of a selected trivalent rare earth metal oxide of very high purity and taken from a group consisting of praseodymium oxide, dysprosium oxide and terbium oxide, or a chemically equivalent mixture consisting of any two or all three of these trivalent rare earth metal oxides in accordance with the use or uses to be made thereof.

It has been found that when such an alumina-silicate glass contains high concentrations of said trivalent rare earth oxide of high purity, it is the rare earth ions thereof of which causes the glass to exhibit the large Verdet constant desired. These rare earth ions each have an unpaired electron in the ground state thereof and are, therefore, paramagneic, and in the presence of a magnetic field, both at ground state and at upper excited states, are split into Zeeman components. It is difficult to tell what the exact energy level conditions for the ions of any one of these trivalent rare earth metal oxide alumina-silicate glasses are because of the uncertainty of the effect of the alumina-silicate glass matrix on these levels.

Quantum mechanics, however, shows that the electron transition probabilities between ground state and excited states are unequal for right-hand circularly polarized light waves and for left circularly polarized light waves being propagated through the glass medium and along the magnetic lines of force; and this difference in transition probabilities arises because of the Zeeman effect mentioned above. Such a splitting produces a difference in the frequency dependence of the right and left circular transitions, a difference in the oscillator strengths of these transitions and a difference in the electron populations in the ground state Zeeman levels; and this last-mentioned effect in the ground state gives rise to both the paramagnetism and the paramagnetic Faraday rotation assoicated with these ions.

It has been found that the paramagnetic Faraday rotation effect is approximately inversely proportional to temperature, and for the ions of praseodymium, dysprosium and terbium is negative in sign. This is the dominant characteristic of the Faraday rotation associated with the trivalent rare earth metal oxide alumina-silicate glasses of the present invention, since the first two of the three effects mentioned earlier are smaller and essentially temperature independent.

The Faraday rotation in the ions is primarily associated with strongly allowed electric dipole $4f$–$5d$ transitions which occur in the ultra-violet and the transitions which occur in the ultra-violet and the transitions $4f$–$4f$ in the ions usually do not contribute a significant amount of Faraday rotation. Therefore, the Faraday rotation effect almost always increases as the wavelength of the radiation is changed to approach that of the strong ultra-violet absorption edge.

To take advantage of this Faraday effect radiation in the form of light of a wavelength shorter than that of the absorption wavelength is directed into the glass and under these conditions, the absorption transitions do not occur but the electrons make a virtual transition. Such a virtual transition decreases the velocity of propagation of the radiation that produces it and the closer the incident wavelength is to the absorption wavelength, the stronger the virtual transition becomes and the slower the light propagates.

It is noted that the right circularly polarized waves propagate faster than the left circularly polarized waves at room temperature and at temperatures lower than room temperature. Thus, the index of refraction for the left circularly polarized wave in the medium is greater than that for the right circularly polarized wave, and the following equations express the relationship between the indices of refraction of these two circularly polarized components of the transmitted light and the magnetic field $H_z$:

$$N^r = N - A(\lambda) H_z \qquad (1)$$

$$N^l = N + A(\lambda) H_z \qquad (2)$$

And wherein $\lambda$ is the (in vacuum) wavelength of the light employed, A is a factor depndent upon this wavelength, and N is the refractive index of the element or medium in the absence of a magnetic field.

These two equations suggest that the indices of refraction of the two circularly polarized wave components within the rare earth glass element can be controlled by the magnetic field and that if the light within the glass is completely circularly polarized in one direction or the other (in a manner which will be later described), the propagation of this light can be speeded up or slowed down by changing the strength of the axial magnetic field $H_z$.

When the element 10 is being used as a Faraday rotator, light that is linearly polarized, as by the polarizing member 12 in FIG. 1 will be directed into the element and this light may be considered as being broken up into two counter-rotating circularly polarized components which then propagate through the element with the indices of refraction given by Equations 1 and 2. (Note that the same general behavior or relationship can also be considered as existing in the case of elliptically polarized light entering the element 10.)

Thus, the two left and right circularly polarized components do not retain a fixed phase relation between themselves as they pass longitudinally through the element 10, and upon emerging from the exit end of element 10, they will re-combine to form polarized light of the same character as that which initially entered. However, this light will be rotated by an angular amount $\theta$; and when the incident light is elliptically polarized light both axes of this elliptical polarization will be rotated through the same angular amount $\theta$.

The value of the angle $\theta$ is given by the following equation:

$$\theta = VHL \quad (3)$$

wherein V is the Verdet constant, H is the applied magnetic field in oersteds, and L is the length (or thickness) in centimeters of the glass element to be traversed. The angle $\theta$ is expressed in minutes and is positive in the direction of the current in the solenoid 18 generating the magnetic field H.

The parameter $A(\lambda)$ is related to the Verdet constant by the relation:

$$A(\lambda) = \frac{V\lambda}{2\pi} \quad (4)$$

Three different good trivalent rare earth metal oxide glasses having desirably low light absorptance and large Verdet constant values may be made from mixtures of the following ingredients:

|  | Percentage by weight | | |
| --- | --- | --- | --- |
|  | No. 1 | No. 2 | No. 3 |
| $Al_2O_3$ | 12.0 | 12.0 | 12.0 |
| $SiO_2$ | 25.0 | 25.0 | 25.0 |
| MgO | 4.0 | 4.0 | 4.0 |
| $Sb_2O_3$ | 1.0 | 1.0 | 1.0 |
| $Pr_6O_{11}$ | 58.0 |  |  |
| $Dy_2O_3$ |  | 58.0 |  |
| $Tb_2O_3$ |  |  | 58.0 |

While a range of 30 to 70% by weight has already been mentioned for the trivalent rare earth metal oxides in the improved glass, ranges for other constituents of the glass compositions are given in the following Tables A and B:

|  | Percentage by weight | |
| --- | --- | --- |
|  | A | B |
| $Al_2O_3$ | 10.0–20.0 | 10.0–20.0 |
| $SiO_2$ | 20.0–46.0 | 20.0–46.0 |
| $Re_2O_3$ (Trivalent rare earth oxides) | 30.0–68.0 | 30.0–70.0 |
| Oxides of divalent metals | 0.5–10.0 | 0.5–10.0 |
| $Be_2O_3$ | 0.5–5.0 |  |
| Alkali metal oxide | 0.1–2.0 |  |

Among the oxides of divalent metals which may be used to aid in the vitrification of the glass batch, MgO, CaO, ZnO, and PbO are preferred. Also, the alkali metal oxides which may be used in small amounts are lithium, sodium and potassium oxides or even small amounts of antimony oxide and/or boric oxide as fluxing agents.

In contrast with the more conventional uses of known rare earth glasses, such as in jewelry, for decorative glass purposes and the like, special care has been found necessary in the preparation of the improved glasses of the present invention for use in Faraday rotation devices, as will be described later. These glasses for Faraday rotator purposes must have good optical and physical properties, must have very low absorption at the wavelengths at which the rare earth ions being used do not themselves absorb and must have, in each case, no more than a low strain birefringence.

To satisfy the requirements of good optical and physical properties which includes freedom from striae, from bubbles and from devitrification, it was necessary in each case to melt these glasses at a temeprature within a range of 1600°±100°. Additionally, to insure low absorption at the transmission wavelengths of the glasses, the highest of purity of all materials has to be employed in making the glasses. It was found, for example, that high purity in each of said rare earth oxides of interest of at least 99.9% pure was necessary. A common impurity in any rare earth oxide can be, in fact, a trace of another rare earth oxide. Any such residual amount of any one of these unwanted rare earth oxides will frequently produce absorption bands in an otherwise transparent wavelength region of the desired rare earth glass.

In general, it is desirable to limit the rare earth content of the glass to the Faraday rotator element to only one of the three preferred trivalent rare earth oxides, namely, praseodymium oxide, dysproesium oxide, and terbium oxide to obtain the largest Verdet constant with the lowest absorption for the particular wavelengths at which each of these rare earth glasses transmit. Furthermore, the Verdet constant from a mixture of any two or even all three of these rare earth oxides in the glass would be about the same as that obtained with an equal concentration of any one of these preferred rare earth oxides. However, the addition of any rare earth oxide other than the three preferred oxides mentioned above would reduce the Verdet constant value of the glass from that obtained by an equal concentration of any single one of said preferred oxides. All of the preferred rare earth oxides are almost equivalents chemically and, for the most part, have the same solubility in like glass bases.

Similar care in using high purity materials with respect to the other ingredients of any glass batch for rotator purposes is required. It was found that minute traces of iron, a material that occurs in small amounts in certain constituents of most glasses, is especially troublesome in glasses of the instant invention. This material, as an impurity, created broad absorption bands in the glass. For best results in the improved rotator glass, iron should be present in amounts no greater than 5 parts per million. In like manner, the presence of Cr, Mn, Ni, Co, Cu and V are undersirable because they likewise introduce unwanted absorption bands into the glasses, and, of course, opacifying agents are also undesirable.

The effective strength of the magneto-optical effects in the improved glasses is reduced by the presence of strain birefringence. Ideally, these glasses should be strain-free so that the polarized light waves that pass through the glass do not change the nature of their polarization; only the azimuth of the polarization should be allowed to rotate as a result of the Faraday effect. As a further consideration which adds complication, the strain birefringence will not be constant throughout a given sample. Therefore, at a selected cross-section of a beam passing through the rotator, the beam might be unevenly depolarized. This depolarization or change in polarization produced by the birefringence, will reduce the effectiveness of an analyzer placed in the output beam of a Faraday rotation device. It is desirable to limit the strain birefringence in the improved glass to less than 7 mμ/cm., and to do this, the glasses must be finely annealed.

In FIG. 2, a graph is shown which has a wavelength scale from 400 to 1500 millimicrons indicated in the horizontal direction thereof and vertically along one side of the graph is a scale of values (min./cm.-Oe.) from 0 to 1.0 for the Verdet constants. Plotted on this graph relative to these two scales are solid line curves marked $A_1$, $B_1$ and $C_1$ obtained at or near normal room temperature for the measurements of the three preferred trivalent rare earth metal oxide alumina-silicate glasses mentioned above. It will be noted that all three curves extend in generally similar directions and each shows an appreciable rise in Verdet values nearer the shorter wavelength end on the graph. Curve $A_1$ was obtained from the praseodymium-containing glass, curve $B_1$ from the dysprosium-containing glass and curve $C_1$ from the terbium-containing glass and at 400 millimicrons (mμ) high values for V for these glasses are approximately 0.8, 0.7 and 0.9 respectively.

In FIG. 8, a graph is shown which also has a wavelength scale horizontally thereon and shown vertically at one side thereof is a scale of values from zero to 0.10 for absorptance ($\alpha$ cm.$^{-1}$). Upon this graph a solid line curve marked $A_2$, a dash-dash curve marked $B_2$ and a dot dash curve marked $C_2$ are shown for the above three glasses respectively. It will be noted that appreciable differences exist with regard to their respective absorptance characteristics. As mentioned previously, terbium is often preferred because of its overall low absorptance throughout a wide range of wavelengths from 400 to 1500 mμ with the exception that a strong absorption band does exist between approximately 465 and 500 mμ. However, it is a relatively expensive glass to make. Accordingly, at certain times, the high dysprosium oxide alumina-silicate glass, which is much less expensive to make, may perform satisfactorily as a Faraday rotation means for light as, for example, in the 500 to 700 mμ region approximately. In like manner, at times, the high praseodymium oxide alumina-silicate glass may perform satisfactorily as a rotator for light as, for example, within the 650 to 900 mμ region, and also, for a narrower region between approximately 510 to 550 and for a somewhat wider region between approximately 1100 and 1200 mμ.

It follows, therefore, at times when, for instance, the light of only a certain wavelength band is to be transmitted, say a near-monochromatic radiation band in the neighborhood of 525 mμ, a more economical mixture of praseodymium and dysprosium oxides could be used in place of the relatively more expensive terbium oxide. Likewise, for a near-monochromatic radiation near 625 mμ, a mixture of dysprosium and terbium oxides could be used with good results, and for a near-monochromatic radiation near 690 mμ, a mixture of praseodymium and terbium oxides would be good. At a radiation near 720 mμ, a mixture of all three preferred oxides would give good results.

Since Faraday rotation in trivalent rare earth metal oxide alumina-silicate glasses is fairly large at ordinary room temperatures, it is possible to subject the rotator to a sinusoidal magnetic field by connecting the solenoid 18 to a source of alternating current within a frequency range from approximately 15 to 10,000 cycles per second and thereby obtain what might be called a Faraday modulation cell for use in high accuracy photoelectric ellipsometer or the like.

It is also possible to use such a modulation cell at lower than room temperatures and obtain an increased magnitude for the Verdet constant. For example, the Faraday rotation will be increased as much as three to four times when such a cell is cooled by liquid nitrogen. Or when used with liquid helium, the amount of Faraday rotation provided by the cell will be much greater. However, the high frequency response of such a cell at liquid helium temperature will be greatly decreased and, at this temperature, the cell will operate best within a range from approximately 15 to 200 cycles per second. In cases wherein liquid nitrogen is used, the high end of such a frequency range will likewise be reduced but by a lesser amount that that produced by liquid helium. The relation between temperature and Faraday rotation will be more fully discussed later.

In FIGURE 3 is shown a light polarizer 12 followed by a quarter-wave birefringent retardation plate 28 secured thereto with its fast or slow axis at 45° to the plane of polarization of the polarizer. Those two members may be used together in place of the single polarizer in FIG. 1 and when so located in the system, the light passing therethrough and incident upon the entrance end of the Faraday rotator 10 will be circularly polarized light. Since the index of refraction for the circularly polarized wave may be controlled by the magnetic field intensity as shown by Equations 1 and 2, the phase of the transmitted light can be changed or shifted as desired by changing the value of the field H. (If the light being supplied to the Faraday rotator 10 is elliptically polarized light, it can be made circularly polarized light for use in such a phase shift system by the choice of a birefringent plate of proper thickness and by using this plate properly oriented relative to the plane of polarization of the incident polarized light.)

If a second polarizer, like that shown at 32 in FIG. 4, is arranged in optical alignment in the arrangement of FIG. 1 so as to receive the light transmitted by element 10 and while the transmitted light is being rotated 45° by the magnetic field, and if this second polarizer has its plane of polarization positioned parallel to the plane of polarization of this transmitted light, as indicated by arrow 34, this light indicated by arrow 36 will be transmitted through the second polarizer 32. Such an arrangement can be used as a Faraday isolator. This is because light such as that indicated by arrow 38 travelling in the reverse direction cannot pass through the system. This reversely-directed light after passing through second polarizer 32 will be plane polarized and then be rotated another 45° by the Faraday rotator 10, with the result that the plane of polarization of this light will then be at 90° to the transmission axis of the first polarizer 12 and this light will not be allowed to pass therethrough. If the Faraday rotation in the glass is less than 45°, the first and second polarizers are oriented with their transmission axes at an angle 90° minus the Faraday rotation angle in the glass. In this manner, the light travelling in the reverse direction 38 is completely blocked while the forwardly travelling light 36 is partially transmitted.

If the first polarized 12 and the second polarized 32 are positioned at opposite sides of the Faraday rotator 10 and with their respective axes of polarization at right angles to each other, it is possible to use this organization of parts as a Faraday shutter and no light will be transmitted when element 10 is not excited. However, if the solenoid 18 is then energized with a pulse of current of suitable magnitude, a magnetic field will be produced which will rotate the plane of polarization of the light 90° and the light will be alowed to pass through. In practice, a Faraday rotation is less than 90° can also be used satisfactorily at times to provide shutter action.

It would also be possible, when the rotator is to be used with plane polarized light, as in a Faraday isolator or in a Faraday shutter arrangement, to slope the entrance and exit surfaces 40 and 42 of the Faraday rotator element 44, as suggested in FIG. 5, an amount equal to the Brewster angle of incidence $i_B$ for the material being used but such sloping would not generally result in these two end surfaces being parallel to each other. Such sloping of the entrance surface would permit incoming plane polarized light in the plane of incidence of the surface to be transmitted with a minimum of loss due to surface reflections. The slope of the exit surface 42, on the other hand, should be such that plane polarized light travelling within the rotator and impinging thereon will have such an angle of incidence at this exit end surface as to provide an angle of refraction for the light exteriorly of the rotator equal to the Brewster angle for the material being used.

In FIG. 6 is shown a modified form of Faraday rotator member 50 which has each of its opposite ends cut on such a sloping angle that light normal to an entrance surface 52 will enter and will be internally reflected a number of times at flat silver or aluminum coated side wall portions 53 and 54 before emerging therefrom through exit end surface 58. Since the direction of Faraday rotation depends only upon the direction of the magnetic field, such a device can be used, for example, with magnet means 59 disposed with opposed poles at opposite sides of the rotator for controlling the rotation and even direction of rotation obtained. An arrangement of this kind not only increases the optical path length for the light and thus the Faraday rotation obtained but as a result thereof allows magnets of smaller sizes to be used therewith.

In FIG. 7 is shown an arrangement wherein an elongated Faraday rotator element 60 is arranged not only for a plurality of internal reflections for longer path length for the light in passing therethrough but also has its entrance surface 62 (and exit surface, not shown) so sloped as to accommodate the light entering therethrough at the Brewster angle $i_B$. As stated previously this will provide a less loss of light due to reflections from the entrance surface. Also, the entrance and exit surfaces of element 60 (and also elements 10, 44 and 54) can be coated with reflection reduction coatings if desired.

These preferred rare earth glasses exhibit paramagnetic Faraday effects. As described earlier, the Verdet constant is approximately inversely proportional to temperatures. Thus, by decreasing the temperature of the improved rare earth glass, the Faraday rotation can be increased. This method of increasing the Verdet constant can be employed for all of the rotator devices described herein. An increased Verdet constant would, of course, decrease the necessary length of the glass and the size of the magnet means required in these devices.

However, cooling the glass will decrease the speed of response of the Faraday rotation to fast changes in the magnetic field being applied thereto. If the glass is cooled to 4.2° K., for example, the relaxation time of the Faraday effect would be on the order of $10^{-2}$ seconds, and such a long relaxation time would be detrimental for use as a high-speed Faraday shutter.

Figure 10:
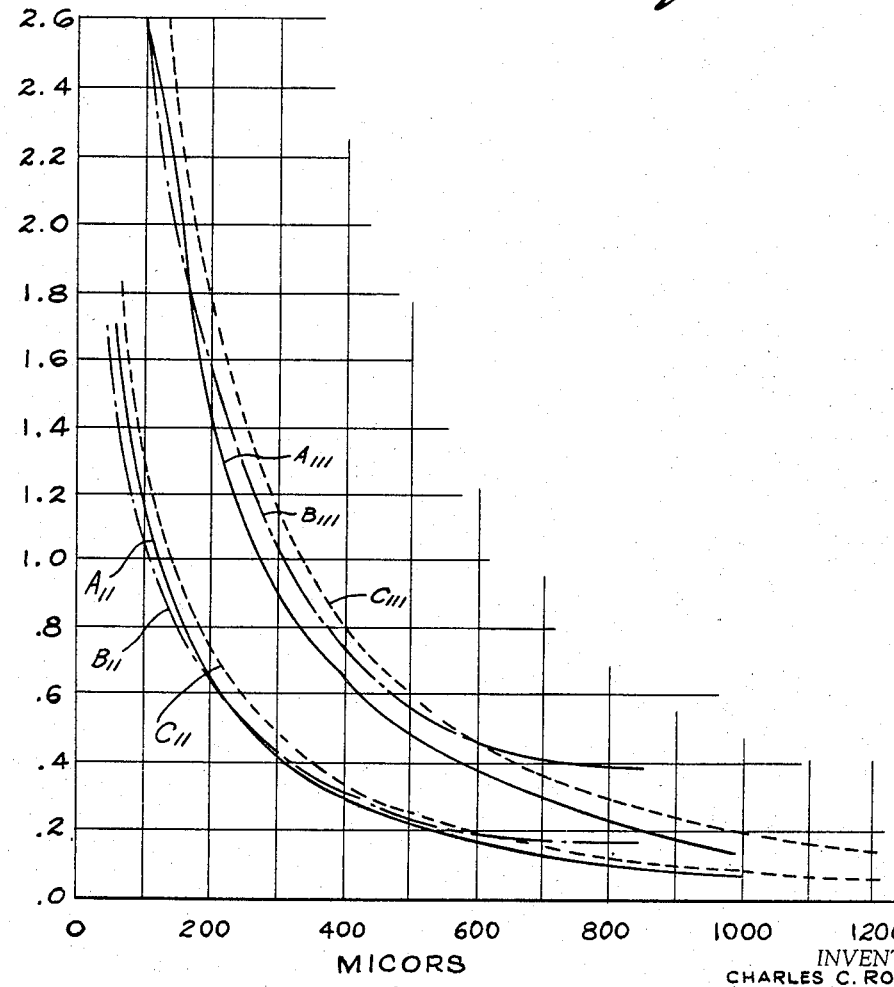
FIG. 10 is a chart, somewhat like that of FIG. 2, but of use in further describing the invention.

When cooling a rotation element, it is necessary to insure that frost does not form on the entrance and exit surfaces thereof through which the polarized optical radiation must pass. To prevent this frost, the rotation element preferably would be, as shown at 64 in FIG. 9, centrally mounted in a cylindrically-shaped jacket or enclosure 66 which is provided with transparent strain and striae-free flat end plates or windows 68 and 69. A second jacket of suitable material 70 encircling and hermetically secured to the first jacket contains a coolant, such as liquid nitrogen or helium in a chamber 72 formed therebetween, and which coolant may be circulated through conduits 72a and 72b. Also, enclosed spaces 74 and 76 are provided adjacent the opposite end surfaces 64a and 64b of the rotator element 64 and are arranged to serve as evacuated spaces that will prevent frost and other liquids from condensing or forming on these optical surfaces. The two strain-free windows 68 and 69 are thus mounted on extensions beyond the coolant jacket so formed and these extensions serve to thermally insulate the windows from the cold. Dry nitrogen or the like can be blown onto the outer surfaces of these windows 68 and 69 to prevent the formation of frost or remove any frost which might have formed. Suitably directed nozzles or jets 78 are provided for this purpose. A winding 80 encircling jacket 70 serves to supply a magnetic field for the rotator element 64. In FIG. 10 is shown a chart like that of FIG. 2 but, instead of showing a curve for the Verdet constant values for each of the trivalent rare earth glasses at room temperature (as in FIG. 2), two additional curves for each glass to show the effects of low temperature conditions upon these glasses have been plotted in FIG. 10. In this latter figure, the curves, indicated at $A_{11}$, $B_{11}$, and $C_{11}$ and by $A_{111}$, and $B_{111}$, and $C_{111}$ are for the same praseodymium oxide-containing glass, for the same dysprosium oxide-containing glass and for the same terbium oxide-containing glass as in FIG. 2, but same have been considered under materially different temperature conditions.

Curves $A_{11}$, $B_{11}$, and $C_{11}$ were made when the respective rotation elements were being maintained by the use of Dry Ice and acetone approximately at the temperature of 196° K. and the curves $A_{111}$, $B_{111}$, and $C_{111}$ were made when the respective elements were being maintained by liquid nitrogen approximately at the relatively very low temperature of 77.3° K. Thus, it can readily be seen that materially improved operating conditions as to Verdet constant values can be had when such lowered temperatures are employed.

Having described my invention, I claim:

1. In combination with a Faraday rotation device of the type having a member formed of glass and having a pair of opposed end walls thereon and side wall portions extending therebetween, and magnet means disposed in adjacent relation to said side wall portions for subjecting said member to the magnetic field of said magnet means, wherein the improvement comprises said member being formed of an alumina-silicate glass having as an essential ingredient a substantial amount of a single trivalent rare earth metal oxide of relatively very high purity therein for providing good light transmission characteristics and a large Verdet constant at a preselected wavelength while being subjected to a predetermined magnetic field.

2. The combination defined in claim 1 in which the trivalent rare earth metal oxide contained in the glass falls within a range of values from approximately 30% to approximately 70% by weight of the ingredients of the glass.

3. In combination with a Faraday rotation device of the type having a member formed of glass and having a pair of opposed end walls thereon and side wall portions extending therebetween, and magnetic means, and with said side wall portions being adapted to have said magnetic means disposed in adjacent relation thereto for subjecting said member to the magnetic field of said magnet means, wherein the improvement comprises said member being formed of an alumina-silicate glass having as an essential ingredient thereof a substantial amount of trivalent rare earth metal oxide of relatively very high purity and being selected from the group consisting of praseodymium oxide, dysprosium oxide, terbium oxide and mixtures thereof for providing good light transmission characteristics and a large Verdet constant at a preselected wavelength while being subjected to a predetermined magnetic field.

4. The combination defined in claim 3 in which the trivalent rare earth metal oxides contained in the glass fall within a range of values from approximately 30% to approximately 70% by weight of the ingredients of the glass.

5. A Faraday rotation member of the type which is formed of glass and having a pair of opposed end walls thereon and side wall portions extending therebetween with said side wall portions being adapted to have magnet means disposed in adjacent relation thereto for subjecting said member to the magnetic field of said magnet means, wherein the improvement comprises forming said member of a glass containing a trivalent rare earth oxide, $Re_2O_3$, selected from the group consisting of praseodymium oxide, dysprosium oxide and terbium oxide and mixtures thereof and consisting essentially of the following ingredients:

| | Percent by wt. |
|---|---|
| $Al_2O_3$ | 10.0–20.0 |
| $SiO_2$ | 20.0–46.0 |
| $Re_2O_3$ | 30.0–68.0 |
| Oxides of glass forming divalent metals | 0.5–10.0 |
| Alkali metal oxides | 0.1–2.0 |
| Other fluxing agents | 0.5–5.0 | for providing good light transmission characteristics and a large Verdet constant at a preselected wavelength while being subjected to a predetermined magnetic field.

6. The combination defined in claim 5 in which the trivalent rare earth oxide is of relatively very high purity and at least as high as 99.9 percent pure.

7. A Faraday rotation member of the type which is formed of glass having a pair of optically finished light transmitting flat surfaces disposed in parallel relation to each other at opposite ends of said member and side wall portions extending therebetween with said side wall portions being adapted to have magnet means disposed in adjacent relation thereto for subjecting said member to the magnetic field of said magnet means, wherein the improvement comprises said member being formed of an alumina-silicate glass having as an essential ingredient thereof a substantial amount of a trivalent rare earth metal oxide of relatively very high purity and selected from a group consisting of praseodymium oxide, dysprosium oxide, terbium oxide and mixtures thereof for providing good light transmission characteristics and a large Verdet constant at a preselected wavelength while being subject to a predetermined magnetic field.

8. In combination with a Faraday rotation device of the type having an elongated member formed of glass and having a pair of optically finished light transmitting flat surfaces disposed in parallel relation to each other at opposite ends of said member and having side wall portions extending therebetween, where said flat end surfaces are so tilted relative to the longitudinal direction of said member as to be substantially at a Brewster angle relative to light entering said member through one of said flat surfaces and travelling substantially longitudinally through said member, magnetic means disposed in adjacent relation thereto for subjecting said member to the magnetic field of said magnet means, wherein the improvement comprises said member being formed of an alumina-silicate glass having as an essential ingredient thereof a substantial amount of a trivalent rare earth metal oxide selected from a group consisting of a praseodymium oxide, dysprosium oxide, terbium oxide and mixtures thereof for providing good light transmission characteristics and a large Verdet constant at a preselected wavelength while being subjected to a predetermined magnetic field.

9. In combination with a Faraday rotation device of the type having an elongated member formed of glass having a pair of optically finished light transmitting flat surfaces disposed in parallel relation to each other at opposite ends of said member and having side wall portions extending therebetween, reflective coatings on certain of said side wall portions, said flat end surfaces being so titlted relative to the longitudinal direction of said member that light travelling in a direction normal to one of said flat end surfaces and entering said member therethrough will be internally reflected a plurality of times by said certain side wall portions before exiting through the other of said flat end surfaces, magnetic means, and with said side wall portions being adapted to have said magnet means disposed in adjacent relation thereto for subjecting said member to the magnetic field of said magnet means, wherein the improvement comprises said member being formed of an alumina-silicate glass having as an essential ingredient thereof a substantial amount of a trivalent rare earth metal oxide selected from a group consisting of praseodymium oxide, dysprosium oxide, terbium oxide and mixtures thereof for providing good light transmission characteristics and a large Verdet constant at a preselected wavelength while being subjected to a predetermined magnetic field.

10. In combination with a Faraday rotation device of the type having an elongated member formed of glass having a pair of optically finished light transmitting flat surfaces disposed in parallel relation to each other at opposite ends of said member and having side wall portions extending therebetween, reflective coatings on certain of said side wall portions, said flat end surfaces being so tilted relative to the longituidnal direction of said member that light entering said member therethrough at a Brewster angle will be internally reflected a predetermined number of times by said coated side wall portions before exiting through the other of said flat end surfaces, magnetic means, and with said side wall portions being adapted to have said magnet means disposed in adjacent relation thereto for subjecting said member to the magnetic field of said magnet means wherein the improvement comprises said member being formed of an alumina-silicate glass having as an essential ingredient thereof a substantial amount of a trivalent rare earth metal oxide selected from a group consisting of praseodymium oxide, dysprosium oxide, terbium oxide and mixtures thereof for providing good light transmission characteristics and a large Verdet constant at a preselected wavelength while being subjected to a predetermine magnetic field.

11. A Faraday rotation member of the type being formed of glass and having a pair of opposed end walls thereon and side wall portions extending therebetween, and with said side wall portions being of sufficient length to accommodate magnet means disposed in adjacent relation thereto for subjecting said member to the magnetic field of said magnet means, wherein the improvement comprises said member being formed of an alumina-silicate glass having as an essential Faraday rotation enhancing ingredient thereof a substantial amount of a trivalent rare earth metal oxide of relatively very high purity, said oxide being praseodymium oxide, and said purity being at least as high as 99.9% pure providing good light transmission characteristics and a large Verdet constant at a preselected wavelength while being subjected to a predetermined magnetic field.

12. A Faraday rotation member of the type being formed of glass and having a pair of opposed end walls thereon and side wall portions extending therebetween, and with said side wall portions being of sufficient length to accommodate magnet means disposed in adjacent relation thereto for subjecting said member to the magnetic field of said magnet means, wherein the improvement comprises said member being formed of an alumina-silicate glass having as an essential Faraday rotation enhancing ingredient thereof a substantial amount of a trivalent rare earth metal oxide of relatively very high purity, said oxide being dysprosium oxide and said purity being at least as high as 99.9% pure for providing good light transmission characteristics and a large Verdet constant at a preselected wavelength while being subjected to a predetermined magnetic field.

13. A Faraday rotation member of the type being formed of glass and having a pair of opposed end walls thereon and side wall portions extending therebetween, and with said side wall portions being of sufficient length to accommodate magnet means disposed in adjacent relation thereto for subjecting said member to the magnetic field of said magnet means, wherein the improvement comprises said member being formed of an alumina-silicate glass having as an essential Faraday rotation enhancing ingredient thereof a substantial amount of a trivalent rare earth metal oxide of relatively very high purity, said oxide being terbium oxide, and said purity being at least as high as 99.9% pure for providing good light transmission characteristics and a large Verdet constant at a preselected wavelength while being subjected to a predetermined magnetic field.

14. In combination with a Faraday rotation device of the type having an elongated member formed of glass having a pair of optically finished light transmitting flat surfaces on the opposite ends thereof and side wall portions extending therebetween, magnetic means, and with said side wall portions being of sufficient length to accommodate said magnet means disposed in adjacent relation to said side wall portions for subjecting said member to the magnetic field of said magnet means, wherein the improvement comprises said member being formed of a glass consisting essentially of the following ingredients:

| | Percent by wt. |
|---|---|
| $Al_2O_3$ | 10.0–20.0 |
| $SiO_2$ | 20.0–46.0 |
| $Re_2O_3$ (rare earth oxides) | 30.0–70.0 | and wherein each of said ingredients are of relatively high purity and with the purity of said rare earth oxide being as high as 99.9% pure providing good light transmission characteristics and a large Verdet constant at a preselected wavelength while being subjected to a predetermined magnetic field.

15. In combination with a Faraday rotation device of the type having a Faraday rotation member formed of glass and having a pair of optically finished surfaces on the opposite ends thereof and with said member being centrally disposed within an elongated enclosure for preventing moisture-ladened air, or the like, from contacting the opposite end surface of said member, transparent windows forming the opposite end walls of said enclosure and arranged in aligned relation with the opposite end surfaces of said member, a coolant chamber surrounding at least that part of the elongated enclosure containing said rotation member, a coolant therein, and magnet means disposed in operative relation to the side wall portions of said rotation member in such a manner as to subject said member to the magnetic field of said magnet means when energized wherein the improvement comprises said member being formed of an alumina-silicate glass containing a trivalent rare earth oxide for providing good light transmission characteristics and a large Verdet constant at a preselected wavelength while being maintained at a predetermined relatively low temperature and subjected to a predetermined magnetic field.

16. In combination with a Faraday rotation device of the type having a Faraday rotation member formed of glass and having a pair of optically finished surfaces on the opposite ends thereof and with said member being centrally disposed within an elongated enclosure for preventing moisture-ladened air, or the like, from contacting the opposite end surfaces of said member, transparent windows forming the opposite end walls of said enclosure and arranged in aligned relation with the opposite end surfaces of said member, a coolant chamber surrounding at least that part of the elongated enclosure containing said rotation member, a coolant therein, magnet means disposed in operative relation to the side wall portions of said rotation member in such a manner as to subject said member to the magnetic field of said magnet means when energized wherein the improvement comprises said rotation member being formed of an alumina-silicate glass having as an essential ingredient thereof a substantial amount of a trivalent rare earth oxide of relatively very high purity therein, said oxide being selected from the group consisting of praseodymium oxide, dysprosium oxide, terbium oxide and mixtures thereof for providing good light transmission characteristics and a large Verdet constant at a preselected wavelength while being maintained at a predetermined relatively low temperature and subjected to a predetermined magnetic field.

17. In combination with a Faraday rotation device of the type having a member formed of glass and having a pair of opposed end walls thereon and side wall portions extending therebetween and magnetic means disposed in adjacent relation to said side wall portions for subjecting said member to the magnetic field of said magnetic means, wherein the improvement comprises said member being formed of an alumina-silicate glass of the following composition:

| | Wt. percent |
|---|---|
| Aluminum oxide | 10.0 to 20.0 |
| Silicon dioxide | 20.0 to 46.0 |
| Terbium oxide | 30.0 to 70.0 | for providing good light transmission characteristics and a large Verdet constant at a preselected wavelength while being subjected to a predetermined magnetic field.

18. The Faraday rotation device as set forth in claim 17, wherein said alumina-silicate glass composition also includes approximately 1 weight percent antimony oxide.

References Cited

UNITED STATES PATENTS

| 3,158,746 | 11/1964 | Lehovec | 350—160 |
| 3,245,314 | 4/1966 | Dillon | 350—151 |
| 3,318,652 | 5/1967 | Berger et al. | 350—151 |

OTHER REFERENCES

C. C. Robinson and R. E. Graf, "Faraday Rotation in Praseodymium, Terbium, and Dysprosium Alumina Silicate Glasses," Applied Optics, vol. 3, No. 10, October 1964, pp. 1190–1191.

C. C. Robinson and R. E. Graf, "Paramagnetic Faraday Rotation in Praseodymium, Terbium and Dysprosium Alumina Silicate Glasses," J.O.S.A., vol. 54, No 11, November 1964, p. 1389 Abstract of paper given at 49th annual meeting, Optical Society of America, Oct. 7, 1964.

DAVID SCHONBERG, Primary Examiner

PAUL R. MILLER, Assistant Examiner

U.S. Cl. X.R.

350—150, 152, 160